США008902517B2

United States Patent
Noda

(10) Patent No.: US 8,902,517 B2
(45) Date of Patent: Dec. 2, 2014

(54) IMAGE CAPTURING LENS AND IMAGE CAPTURING APPARATUS

(71) Applicant: FUJIFILM Corporation, Tokyo (JP)

(72) Inventor: Takayuki Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/039,981

(22) Filed: Sep. 27, 2013

(65) Prior Publication Data

US 2014/0028901 A1    Jan. 30, 2014

Related U.S. Application Data

(63) Continuation of application No. PCT/JP2012/002191, filed on Mar. 29, 2012.

(30) Foreign Application Priority Data

Mar. 30, 2011 (JP) ................................. 2011-076178
Mar. 26, 2012 (JP) ................................. 2012-069527

(51) Int. Cl.
*G02B 9/60* (2006.01)
*H04N 5/225* (2006.01)
*G02B 13/00* (2006.01)
*G02B 13/18* (2006.01)

(52) U.S. Cl.
CPC ............... *H04N 5/2254* (2013.01); *G02B 9/60* (2013.01); *G02B 13/0045* (2013.01); *G02B 13/18* (2013.01)
USPC ........................................................ 359/770

(58) Field of Classification Search
CPC ............. G02B 9/00; G02B 9/60; G02B 9/62; G02B 9/64; G02B 13/0045
USPC .................. 359/714, 754–756, 761, 763, 770
See application file for complete search history.

(56) References Cited

U.S. PATENT DOCUMENTS

| | | | |
|---|---|---|---|
| 6,282,033 | B1 | 8/2001 | Ning |
| 7,110,188 | B2 | 9/2006 | Matsui et al. |
| 7,663,813 | B2 | 2/2010 | Lai |
| 2012/0162769 | A1 | 6/2012 | Suzuki et al. |

FOREIGN PATENT DOCUMENTS

| | | |
|---|---|---|
| CN | 100410713 | 8/2008 |
| JP | 9-166748 | 6/1997 |
| JP | 11-142730 | 5/1999 |
| JP | 3005905 | 11/1999 |
| JP | 3788133 | 4/2006 |
| JP | 3809270 | 5/2006 |
| WO | WO 2004/107009 | 12/2004 |

OTHER PUBLICATIONS

International Search Report, PCT/JP2012/002191, Jul. 17, 2012.

*Primary Examiner* — Darryl J Collins
(74) *Attorney, Agent, or Firm* — Young & Thompson

(57) ABSTRACT

Arranging a negative first lens, a positive second lens, a negative third lens, a positive fourth lens, and a positive fifth lens from the object side, in which the image side surface of the fifth lens has an aspherical shape with one or more inflection points and a concave shape toward the image side in a paraxial region, and, when the overall optical length, focal length of the entire lens system, focal length of the first lens, distance between image side surface of the second lens and object side surface of the third lens, refractive index of the second lens, and refractive index of the third lens are taken as TL, f, f1, $Dg_{2-3}$, N2, and N3 respectively, the image capturing lens is configured to simultaneously satisfy conditional expressions (1a): $1.0 \leq TL/f \leq 1.8$, (2a): $0.09 < Dg_{2-3}/f$, (3a): $0.07 < |N2-N3|$, and (4a): $-35 \leq f1/f \leq -2.3$.

20 Claims, 4 Drawing Sheets

EXAMPLE 1

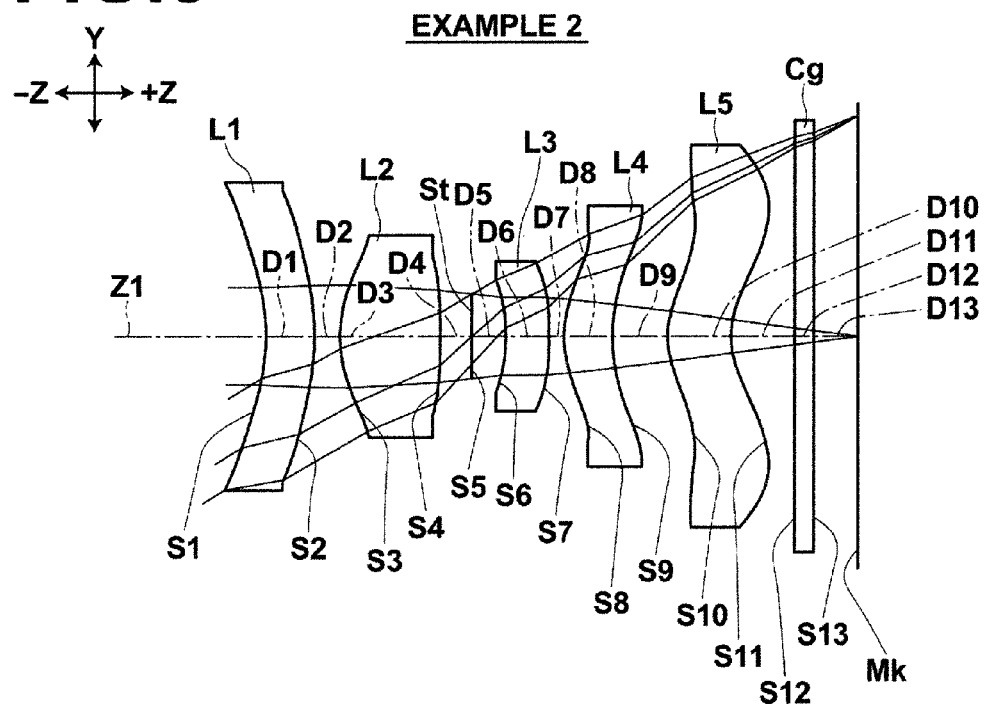
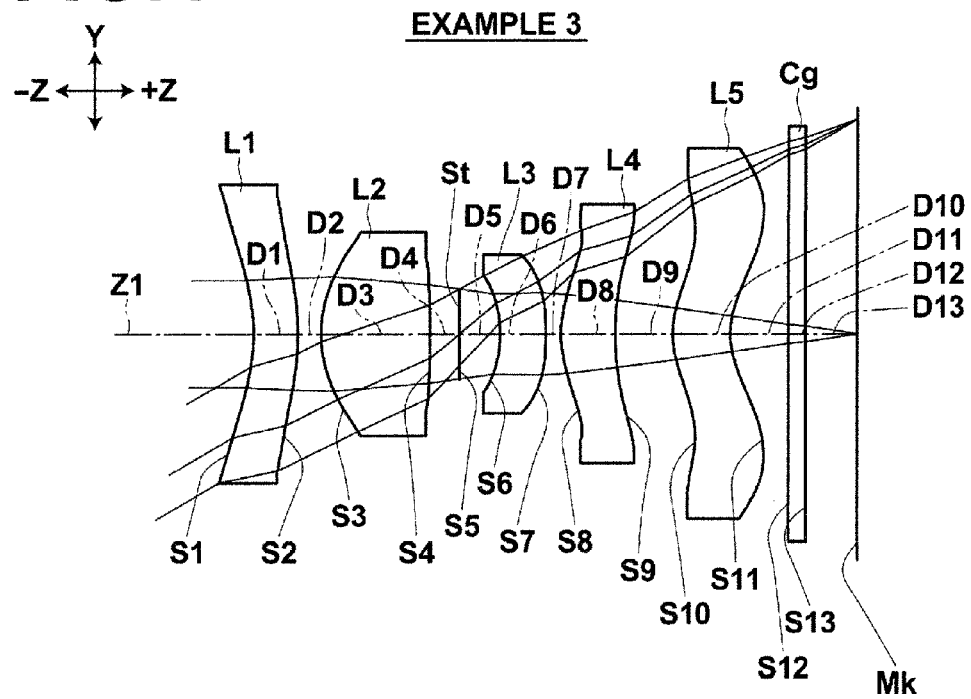

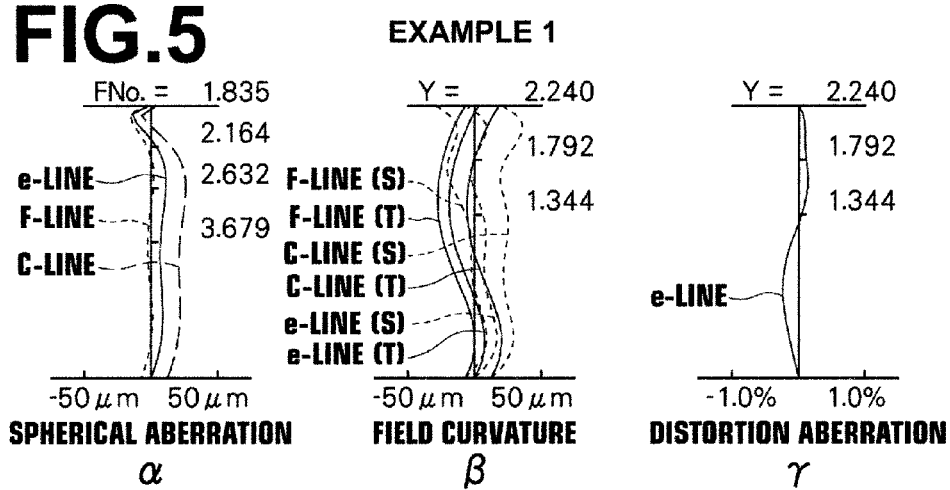
FIG.5 EXAMPLE 1
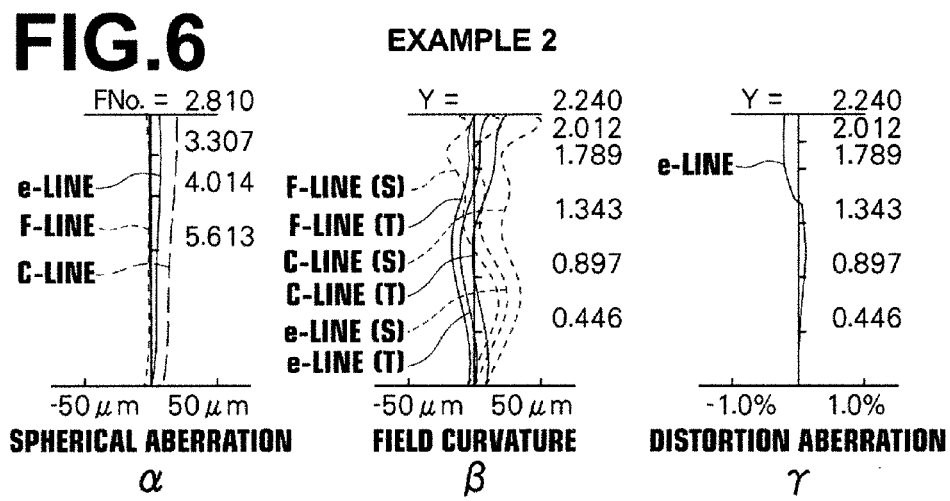
FIG.6 EXAMPLE 2
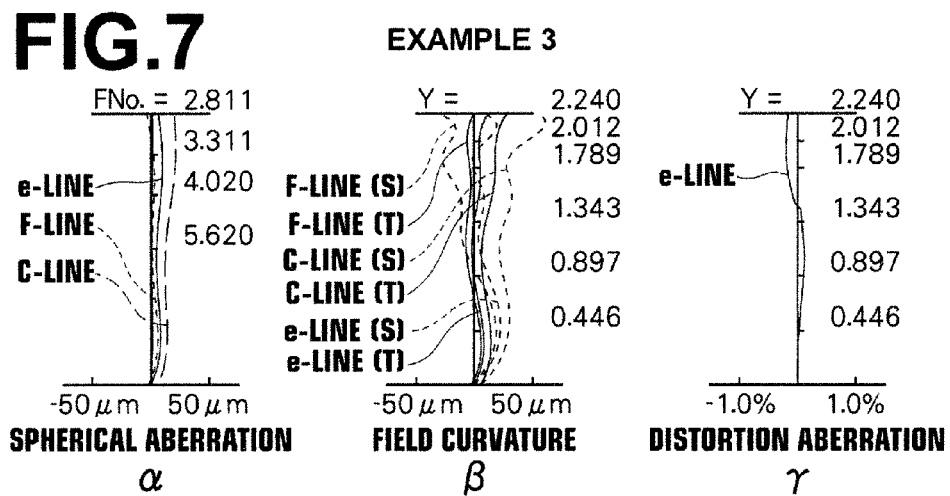
FIG.7 EXAMPLE 3

IMAGE CAPTURING LENS AND IMAGE CAPTURING APPARATUS

CROSS REFERENCE TO RELATED APPLICATIONS

This application is a Bypass continuation of PCT/JP2012/002191 filed on Mar. 29, 2012, which claims priority to Japanese Application No. 2011-076178 filed on Mar. 30, 2011 and 2012-069527 filed on Mar. 26, 2012. The entire contents of each of the above applications are hereby incorporated by reference.

TECHNICAL FIELD

The present invention relates to an image capturing lens for forming an optical image of a subject on an image sensor, such as a CCD (Charge Coupled Device), CMOS (Complementary Metal Oxide Semiconductor), or the like, and an image capturing apparatus provided with the image capturing lens to perform image capturing, such as a digital still camera, camera-equipped cell phone, personal digital assistance (PDA), smartphone, or the like.

BACKGROUND ART

Recently, along with the spread of personal computers to homes and the like, digital still cameras capable of inputting image information obtained by imaging a landscape, a person, or the like to a personal computer have been spreading rapidly. In addition, more and more cell phones and smartphones have built-in camera modules for inputting images. Such devices with image capturing capabilities employ image sensors such as CCDs, CMOSs, and the like. Recently, these types of image sensors have been downsized greatly and, consequently, image capturing devices as a whole and image capturing lenses to be mounted on such devices have also been required to have more compact sizes. At the same time, the pixel count of image sensors has been increasing, thereby causing a growing demand for improvement of image capturing lenses in resolution and performance.

As such image capturing lenses, those downsized by reducing the number of lenses, for example, to four or further to three are known. Further, as image capturing lenses used when a high resolving power is required, those with increased number of lenses, for example, those that use five lenses in order to improve the optical performance are known.

As image capturing lenses that use five lenses in order to improve the optical performance, those composed of a first lens having a negative power, a second lens having a positive power, a third lens having a negative power, a fourth lens having a positive power, and a fifth lens having a positive power arranged in this order from the object side are known (refer to U.S. Pat. No. 7,110,188, Japanese Patent No. 3005905, Japanese Unexamined Patent Publication No. 9 (1997)-166748, Japanese Unexamined Patent Publication No. 11 (1999)-142730, Japanese Patent No. 3788133, Japanese Patent No. 3809270, U.S. Pat. No. 6,282,033, U.S. Pat. No. 7,663,813, and Chinese Patent No. 100410713C).

DISCLOSURE OF THE INVENTION

However, the image capturing lenses that use five lenses described above are difficult to obtain sufficient brightness because the resolving power is reduced if trying to increase the aperture to get sufficient brightness (for example, the image capturing lens of Patent Document 1 or the like is premised on an F-number of around 2.8).

Further, in the five element image capturing lenses described above, if trying to reduce the thickness (reduce the overall optical length), inhibition of various aberrations (e.g., chromatic aberration and distortion) becomes difficult, thereby causing a problem that a desired resolving power may not be obtained.

Still further, there is also a demand that, while maintaining the balance between the central region in which a main subject appears and the peripheral region in which a background appears, the image quality of the background be improved, and an image capturing lens capable of providing a satisfactory resolution also in a region where the diagonal angle of view becomes 50° or greater is sought.

The present invention has been developed in view of the circumstances described above and it is an object of the present invention to provide an image capturing lens which is bright and high resolution to a peripheral angle of view with reduced overall length, and an image capturing apparatus provided with the image capturing lens.

An image capturing lens of the present invention substantially consists of a first lens having a negative power, a second lens having a positive power, a third lens having a negative power, a fourth lens having a positive power, and a fifth lens having a positive power, arranged in this order from the object side, wherein: the image side surface of the fifth lens has an aspherical shape with one or more inflection points and a concave shape toward the image side in a paraxial region; and the image capturing lens satisfies the following conditional expressions (1a): $1.0 \leq TL/f \leq 1.8$, (2a): $0.09 < Dg_{2\text{-}3}/f$, (3a): $0.07 < |N2-N3|$, and (4a): $-35 \leq f1/f \leq -2.3$ simultaneously, where: TL is an overall optical length (when a distance from the image side surface of the fifth lens to the image plane is represented by an air equivalent length); f is a focal length of the entire lens system; f1 is a focal length of the first lens; $Dg_{2\text{-}3}$ is a distance (air space) between the image side surface of the second lens and the object side surface of the third lens; N2 is a refractive index of the optical member constituting the second lens; and N3 is a refractive index of the optical member constituting the third lens.

The image capturing lens described above may be formed to satisfy a conditional expression (5a): $0.80 \leq f12/f \leq 1.40$, where f12 is a combined focal length of the first and second lenses.

The image capturing lens described above may be formed to satisfy a conditional expression (6a): $54 < v2$, where v2 is an Abbe number of the second lens.

The image capturing lens described above may be formed to satisfy a conditional expression (7a): $20 < v3 < 35$, where v3 is an Abbe number of the third lens.

The image capturing lens described above may be formed to satisfy a conditional expression (8a): $-12 < (R1+R2)/(R1-R2) < -0.21$, where: R1 is a radius of curvature of the object side surface of the first lens (first lens surface); and R2 is a radius of curvature of the image side surface of the first lens (second lens surface).

The image capturing lens described above may be formed to satisfy a conditional expression (9a): $20 < v1 < 95$, where v1 is an Abbe number of the first lens.

The image capturing lens described above may be formed to satisfy a conditional expression (10a): $0.7 \leq f4/f \leq 2.1$, where f4 is a focal length of the fourth lens.

The image capturing lens described above may be formed to satisfy a conditional expression (11a): $0.25 < (Dg2+Dg3)/f < 0.7$, where: Dg2 is a center thickness of the second lens (a distance between the object side surface and image side surface of the second lens on the optical axis; actual length); and Dg3 is a center thickness of the third lens (a distance between the object side surface and image side surface of the third lens on the optical axis; actual length).

The image capturing lens described above may be formed to satisfy a conditional expression (12a): $50<\nu 4<65$, where $\nu 4$ is an Abbe number of the fourth lens.

The image capturing lens described above may be formed to satisfy a conditional expression (13a): $50<\nu 5<65$, where $\nu 5$ is an Abbe number of the fifth lens.

The image capturing lens described above may be formed to satisfy a conditional expression (14a): $-4<\Sigma(f_j/\nu_j)/f<4$, where $\Sigma(f_j/\nu_j)/f$ represents the expression: $[(f1/\nu 1)+(f2/\nu 2)+(f3/\nu 3)+(f4/\nu 4)+(f5/\nu 5)]/f$.

The image side surface of the fifth lens may be formed to have only one extreme point.

The image capturing lens described above may be formed to satisfy a conditional expression (4b): $-30 \leq f1/f \leq -4.0$.

The image capturing lens described above may be formed to satisfy a conditional expression (5b): $0.80 \leq f12/f \leq 1.30$, where f12 is a combined focal length of the first and second lenses.

The image capturing lens described above may be formed to satisfy a conditional expression (5c): $0.60 \leq f12/f \leq 1.30$, where f12 is a combined focal length of the first and second lenses.

The image capturing lens described above may be formed to satisfy a conditional expression (6b): $54<\nu 2<79$, where $\nu 2$ is an Abbe number of the second lens.

The image capturing lens described above may be formed to satisfy a conditional expression (9b): $20<\nu 1<75$, where $\nu 1$ is an Abbe number of the first lens.

The image capturing lens described above may be formed to satisfy a conditional expression (9c): $50<\nu 1<65$, where $\nu 1$ is an Abbe number of the first lens.

The image capturing lens described above may be formed to satisfy a conditional expression (14b): $-2<\Sigma(f_j/\nu_j)/f<0.5$, where $\Sigma(f_j/\nu_j)/f$ represents: $[(f1/\nu 1)+(f2/\nu 2)+(f3/\nu 3)+(f4/\nu 4)+(f5/\nu 5)]/f$.

An image capturing apparatus of the present invention includes the image capturing lens described above and an image sensor for outputting an image capturing signal obtained by capturing an optical image formed by the image capturing lens.

The term "extreme point" as used herein refers to a point having an extreme value which is a local maximum or minimum value of an f(r) function, where r is a distance from the optical axis and f(r) represents a depth at r. Note that only an extreme point within a given effective region is discussed here. As the extreme value is a local concept, a certain point taking an extreme value does not always take a maximum or minimum value in the entire region, but the extreme value may be considered to be a candidate of a maximum or minimum value within an arbitrary section.

The term "inflection point" as used herein refers to a point on a curve within a given effective region where the sign (plus, minus) of the curve changes (becomes 0 at the point).

Further, the term "curvature" as used herein refers to a paraxial curvature.

According to the image capturing lens of the present invention, a first lens having a negative power, a second lens having a positive power, a third lens having a negative power, a fourth lens having a positive power, and a fifth lens having a positive power are arranged in this order from the object side, in which the image side surface of the fifth lens is formed to have an aspherical shape with one or more inflection points and a concave shape toward the image side in a paraxial region, and the image capturing lens is configured to satisfy conditional expressions (1a): $1.0 \leq TL/f \leq 1.8$, (2a): $0.09<Dg_{2-3}/f$, (3a): $0.07<|N2-N3|$, and (4a): $-35 \leq f1/f \leq -2.3$ simultaneously. This makes the image capturing lens bright and high resolution to a peripheral angle of view with reduced overall length.

Here, the conditional expression (1a) defines the range of the ratio of the overall optical length to the focal length of the entire lens system.

If the image capturing lens is configured to fall below the lower limit of the conditional expression (1a), the power of each lens needs to be increased and various types of aberrations are aggravated, thereby causing a problem that the optical performance is degraded. Further, an axial light beam and an off-axis light beam come too close to each other on the object side surface of the first lens, so that a problem arises that it is difficult to balance the aberrations for both the axial and off-axial light beams simultaneously.

On the other hand, if the image capturing lens is configured to exceed the upper limit of the conditional expression (5a), the downsizing of the optical system becomes difficult, so that it is difficult to apply the image capturing lens to an image capturing apparatus required to be compact.

The conditional expression (2a) relates to the ratio of the air space between the second and third lenses to the focal length of the entire lens system, and defines a desirable range for balancing between spherical and coma aberrations.

If the image capturing lens is configured to fall below the lower limit of the conditional expression (2a), the difference between the beam height of an off-axis light beam exiting from the second lens and the beam height of an axial light beam entering to the third lens becomes small, thereby causing problems that the spherical aberration is likely to become over (excessive correction), and coma aberration is aggravated and the negative impact on the astigmatism is increased.

The conditional expression (3a) defines a desirable range of differences in refractive index between the second and third lenses.

If the image capturing lens is configured to fall below the lower limit of the conditional expression (3a), problems arises, in the case of a bright lens, that spherical aberration is likely to be increased in the direction of over (excessive correction), and Petzval sum is increased, whereby field curvature is increased in the direction of under (insufficient correction).

The conditional expression (4a): $-35 \leq f1/f \leq -2.3$ relates to the ratio of the focal length of the first lens to the focal length of the entire lens system, and defines a range for inhibiting the occurrence of various types of aberrations.

If the image capturing lens is configured to fall below the lower limit of the conditional expression (4a), comma aberration and spherical aberration occur and a satisfactory aberration correction becomes difficult.

On the other hand, if the image capturing lens is configured to exceed the upper limit of the conditional expression (4a), astigmatism and coma aberration occur and a satisfactory aberration correction becomes difficult.

BRIEF DESCRIPTION OF DRAWINGS

FIG. 3 is a cross-sectional view of an image capturing lens of Example 2, illustrating the cross-section thereof.

FIG. 4 is a cross-sectional view of an image capturing lens of Example 3, illustrating the cross-section thereof.

FIG. 5 shows aberration diagrams of the image capturing lens of Example 1.

FIG. 6 shows aberration diagrams of the image capturing lens of Example 2.

FIG. 7 shows aberration diagrams of the image capturing lens of Example 3.

BEST MODE FOR CARRYING OUT THE INVENTION

Hereinafter, an embodiment of the present invention will be described with reference to the accompanying drawings.

Figure 1:
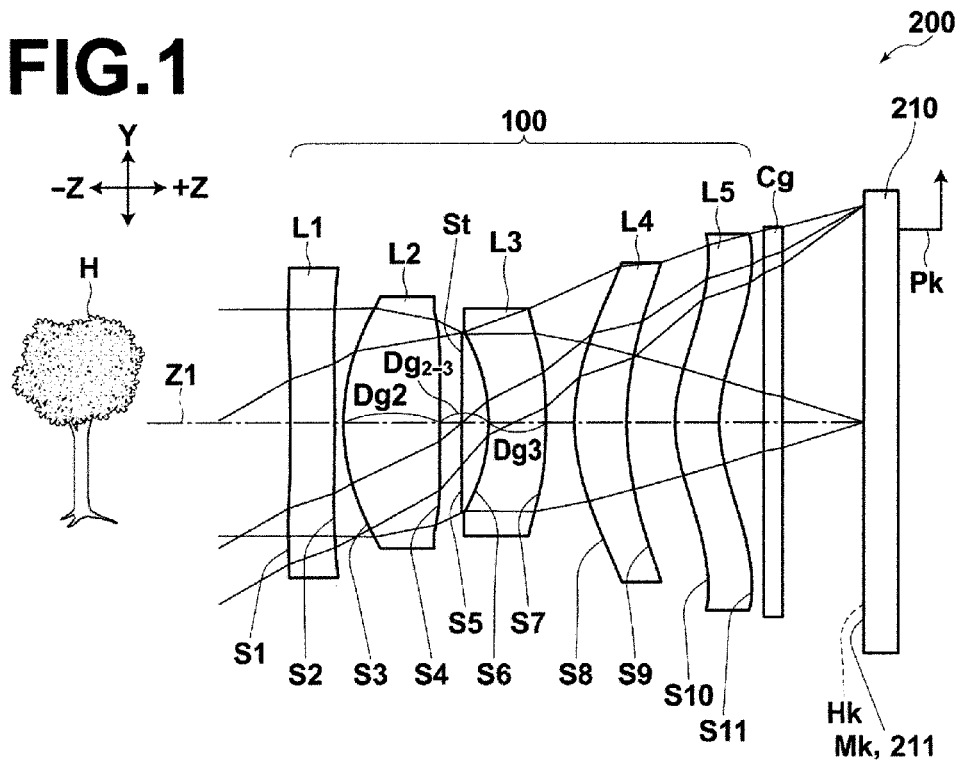
FIG. 1 is a cross-sectional view of an image capturing apparatus provided with an image capturing lens according to an embodiment of the present invention, illustrating a schematic configuration thereof.

FIG. 1 illustrates a schematic configuration of an image capturing apparatus 200 provided with an image capturing lens 100 according to an embodiment of the present invention.

The image capturing lens 100 illustrated in FIG. 1 is suitably applied to various types of image capturing devices that use an image sensor, such as CCD, CMOS, or the like. It is particularly useful for relatively small portable terminal devices, such as digital still cameras, camera-equipped cell phones, PDAs, and the like.

The image capturing apparatus 200 illustrated in FIG. 1 includes the image capturing lens 100 described above and an image sensor 210, such as CCD, CMOS, or the like, for outputting image capturing signal Pk according to an optical image Hk representing a subject H formed by the image capturing lens 100. The image capturing surface 211 of the image sensor 210 is disposed on the image forming surface Mk of the image capturing lens 100.

Various types of optical members Cg may be disposed between the fifth lens L5 which is the most image side lens constituting the image capturing lens 100 and image sensor 210 according to the structure of the image capturing apparatus 200 to which the image capturing lens 100 is installed. For example, an optical member, such as a cover glass for protecting the image capturing surface or an infrared cut filter, ND filter may be disposed as the optical member Cg. The optical member Cg may be a plane parallel plate.

The image capturing lens 100 is composed of five lenses and used for image formation.

The image capturing lens 100 is configured by arranging a first lens L1 having a negative power, a second lens L2 having a positive power, a third lens L3 having a negative power, a fourth lens L4 having a positive power, and a fifth lens L5 having a positive power in this order from the object side (arrow −Z side in FIG. 1) along the optical axis Z1.

The image side surface S11 of the fifth lens L5 has an aspherical shape with one or more inflection points and a concave shape toward the image side in a paraxial region.

Further, the image capturing lens 100 satisfies conditional expressions (1a): $1.0 \leq TL/f \leq 1.8$, (2a): $0.09 < Dg_{2-3}/f$, (3a): $0.07 < |N2-N3|$, and (4a): $-35 \leq f1/f \leq -2.3$ simultaneously. Here, TL is an overall optical length (plane parallel plate on the image side is represented by an air equivalent length), f is a focal length of the entire lens system; f1 is a focal length of the first lens; $Dg_{2-3}$ is a distance (air space) between the image side surface S4 of the second lens L2 and the object side surface S6 of the third lens L3; N2 is a refractive index of the optical member constituting the second lens; and N3 is a refractive index of the optical member constituting the third lens.

Preferably, an upper limit is set to the conditional expression (2a): $0.09 < Dg_{2-3}/f$ as a conditional expression (2b): $0.09 < Dg_{2-3}/f < 0.21$. Further, preferably, an upper limit is set to the conditional expression (3a): $0.07 < |N2-N3|$ as a conditional expression (3b): $0.07 < |N2-N3| < 0.18$. Still further, preferably, the conditional expression (4a): $-35 \leq f1/f \leq -2.3$ is modified as a conditional expression (4b): $-30 \leq f1/f \leq -4.0$.

Examples 1 to 3 are examples of the image capturing lens according to the embodiment of the present invention described above.

The image side surface S11 of the fifth lens L5 may be formed to have only one extreme point.

The image capturing lens 100 may include an aperture stop St between the second lens L2 and third lens L3. If the image capturing lens is configured to include the aperture stop St between the second and third lenses, field curvature may be corrected more satisfactorily as the Petzval sum is reduced. Further, the image capturing lens may be made bright (to have a small F-number) while spherical aberration, longitudinal chromatic aberration, and coma aberration are inhibited more reliably in comparison with the case in which an aperture stop is disposed on the object side of the second lens.

The image capturing lens 100 described above may include an aperture stop St on the object side of the second lens L2. If the image capturing lens is configured to include the aperture stop St on the object side of the second lens, the incident angle of the light beam on the image forming surface is reduced in comparison with the case in which an aperture stop is disposed on the image side of the second lens, rapid changes on the image forming surface in the amount of incident light and distortion according to the image height may be inhibited. Along with this, the overall optical length may be reduced more reliably.

The image capturing lens 100 described above may be configured to satisfy, as appropriate, each conditional expression given below.

Conditional Expression (5a): $0.80 \leq f12/f \leq 1.40$
Conditional Expression (5b): $0.80 \leq f12/f \leq 1.30$
Conditional Expression (5c): $0.60 \leq f12/f \leq 1.30$
Conditional Expression (5d): $0.65 \leq f12/f \leq 1.30$
Conditional Expression (6a): $54 < \nu 2$
Conditional Expression (6b): $54 < \nu 2 < 79$
Conditional Expression (6c): $55 < \nu 2 < 65$
Conditional Expression (7a): $20 < \nu 3 < 35$
Conditional Expression (8a): $-12 < (R1+R2)/(R1-R2) < -0.21$
Conditional Expression (9a): $20 < \nu 1 < 95$
Conditional Expression (9b): $20 < \nu 1 < 75$
Conditional Expression (9c): $50 < \nu 1 < 65$
Conditional Expression (10a): $0.7 \leq f4/f \leq 2.1$
Conditional Expression (11a): $0.25 < (Dg2+Dg3)/f < 0.7$
Conditional Expression (12a): $50 < \nu 4 < 65$
Conditional Expression (13a): $50 < \nu 5 < 65$
Conditional Expression (14a): $-4 < \Sigma(fj/\nu j)/f < 4$
Conditional Expression (14b): $-2 < \Sigma(fj/\nu j)/f < 0.5$ <Meaning of Each Parameter> f: Focal Length of Entire Lens System
f1: Focal Length of First Lens
f2: Focal Length of Second Lens
f3: Focal Length of Third Lens
f4: Focal Length of Fourth Lens
f5: Focal Length of Fifth Lens
fj: Focal length of $j^{th}$ Lens (where, j=1 to 5)
f12: Combined Focal Length of First and Second Lenses TL: Overall Optical Length (plane parallel plate on the image side is represented by an air equivalent length)

v1: Abbe Number of First Lens v2: Abbe Number of Second Lens v3: Abbe Number of Third Lens v4: Abbe Number of Fourth Lens v5: Abbe Number of Fifth Lens vj: Abbe Number of Optical Member Constituting $j^{th}$ Lens (where, j=1 to 5)

Dg2: Center Thickness of Second Lens (Distance between Object Side Surface and Image Side Surface of Second Lens on Optical Axis; Actual Length)

Dg3: Center Thickness of Third Lens (Distance between Object Side Surface and Image Side Surface of Third Lens on Optical Axis; Actual Length)

$Dg_{2-3}$: Distance (Air Space) between Image Side Surface of Second Lens and Object Side Surface of Third Lens R1: Radius of Curvature of Object Side Surface of First Lens (First Lens Surface)

R2: Radius of Curvature of Image Side Surface of First Lens (Second Lens Surface)

R4: Radius of Curvature of Image Side Surface of Second Lens (Fourth Lens Surface)

N2: Refractive Index of Optical Member Constituting Second Lens

N3: Refractive Index of Optical Member Constituting Third Lens

Note that the expression $\Sigma(fj/vj)/f$ represents the expression: $[(f1/v1)+(f2/v2)+(f3/v3)+(f4/v4)+(f5/v5)]/f$.

The terms "object side surface" and "image side surface" as used herein refer to lens surfaces on the object side and image side respectively.

Note that focal lengths are set with a positive or negative value, in which, for an optical element (lens or the like), if the focal point is formed on the image side of the optical element, it is deemed positive, while if the focal point is formed on the object side of the optical element, it is deemed negative.

Further, radii of curvature are set with a positive or negative value, in which if the surface is convex on the object side, it is deemed positive, while if the surface is convex on the image side, it is deemed negative. In the case where a lens surface is an aspherical surface, a value of the radius of curvature of the aspherical surface in the paraxial region is used as the radius of curvature.

<Description of Advantageous Effects of Each Conditional Expression>

The conditional expression (5a): $0.80 \le f12/f \le 1.40$ relates to the ratio of combined focal length of the first and second lenses to the focal length of the entire lens system and defines a desirable range for securing an appropriate back focus while inhibiting distortion.

If the image capturing lens is configured to fall below the lower limit of the conditional expression (5a), a problem arises that the combined focal length of the first and second lenses becomes too short to secure back focus and the lens becomes inadequate for practical use due to a large distortion.

On the other hand, if the image capturing lens is configured to exceed the upper limit of the conditional expression (5a), a problem arises that the back focus becomes long, thereby making it difficult to reduce the overall optical length.

If the image capturing lens is configured to satisfy the conditional expression (5b): $0.80 \le f12/f \le 1.30$, the problems that occur at the lower and upper limits described above may be improved more reliably.

The conditional expression (5c): $0.60 \le f12/f \le 1.30$ relates to the ratio of combined focal length of the first and second lenses to the focal length of the entire lens system and defines a desirable range for securing an appropriate back focus while inhibiting distortion.

If the image capturing lens is configured to fall below the lower limit of the conditional expression (5c), problems arise that the combined focal length of the first and second lenses becomes too short to secure back focus and the lens becomes inadequate for practical use due to a large distortion.

On the other hand, if the image capturing lens is configured to exceed the upper limit of the conditional expression (5c), a problem arises that the back focus becomes long, thereby making it difficult to reduce the overall optical length.

If the image capturing lens is configured to satisfy the conditional expression (5d): $0.65 \le f12/f \le 1.30$, the problems that occur at the lower and upper limits described above may be improved more reliably.

The conditional expression (6a): $54<v2$ relates to the Abbe number of optical member used for the second lens and defines a desirable range for inhibiting various types of aberrations by balancing between longitudinal chromatic aberration and lateral chromatic aberration, while inhibiting coma aberration.

Preferably, the image capturing lens of the present invention is configured to satisfy the expression (6a) with the upper limit, i.e., the conditional expression (6b): $54<v2<79$.

If the image capturing lens is configured to fall below the lower limits of the conditional expressions (6a) and (6b), a problem arises that the balance between longitudinal chromatic aberration and lateral chromatic aberration is disrupted.

If the image capturing lens is configured to exceed the upper limit of the conditional expressions (6b), a problem arises that coma aberration is likely to occur as the usable optical material is limited and, as a result, an optical material with a low refractive index is used for the second lens.

Further, if the image capturing lens is configured to satisfy the conditional expression (6c): $55<v2<65$, the problems that occur at the lower and upper limits described above may be improved more reliably.

The conditional expression (7a): $20<v3<35$ relates to the Abbe number of optical member used for the third lens and defines a desirable range for balancing between longitudinal chromatic aberration and lateral chromatic aberration to inhibit the occurrence of various types of aberrations, while inhibiting the occurrence of lateral chromatic aberration.

If the image capturing lens is configured to fall below the lower limit of the conditional expression (7a), a problem arises that the balance between longitudinal chromatic aberration and lateral chromatic aberration is disrupted and the size of an optical image formed by short wavelength light becomes larger than that of an optical image formed by long wavelength light.

On the other hand, if the image capturing lens is configured to exceed the upper limit of the conditional expression (7a), a problem arises that lateral chromatic aberration is likely to occur.

The conditional expression (8a): $-12<(R1+R2)/(R1-R2)<-0.21$ relates to the relationship between the radius of curvature of the object side surface and radius of curvature of the image side surface of the first lens and defines a desirable range for balancing between mainly coma aberration and the other aberration to inhibit the occurrence of both aberrations.

If the image capturing lens is configured to fall below the lower limit of the conditional expression (8a), a problem arises that coma aberration is aggravated, leading to aggravation of lateral chromatic aberration.

On the other hand, if the image capturing lens is configured to exceed the upper limit of the conditional expression (8a), a problem arises that coma aberration is aggravated, causing also aggravation of astigmatism.

The conditional expression (9a): $20<v1<95$ relates to the Abbe number of optical member used for the first lens and defines a desirable range for appropriately correcting longitudinal chromatic aberration.

If the image capturing lens is configured to fall below the lower limit of the conditional expression (9a), a problem arises that the correction of longitudinal chromatic aberration becomes insufficient.

On the other hand, if the image capturing lens is configured to exceed the upper limit of the conditional expression (9a), a problem arises that the correction of longitudinal chromatic aberration becomes excessive.

Here, if the image capturing lens is configured to satisfy the conditional expression (9b): $20<v1<75$, the problems that occur at the lower and upper limits described above may be improved more reliably.

If the image capturing lens is configured to satisfy the conditional expression (9c): $50<v1<65$, the problems that occur at the lower and upper limits described above may be improved still more reliably.

The conditional expression (10a): $0.7 \leq f4/f \leq 2.1$ relates to the ratio of the focal length of the fourth lens to the focal length of the entire lens system and defines a desirable range for obtaining an appropriate back focus while maintaining telecentricity.

If the image capturing lens is configured to fall below the lower limit of the conditional expression (10a), a problem arises that the back focus becomes too long.

On the other hand, if the image capturing lens is configured to exceed the upper limit of the conditional expression (10a), a problem arises that the exit angle of the most peripheral light beam passing through the aperture to the image side at the time of exiting from the image side surface of the fourth lens becomes large, causing difficulty in ensuring telecentricity.

The conditional expression (11a): $0.25<(Dg2+Dg3)/f<0.7$ relates to the total thickness of the center thicknesses of the second and third lenses and defines a desirable range for making the image capturing lens bright (to have a small F-number). That is, in order to make the image capturing lens bright, it is necessary to set the center thicknesses of the second and third lenses to appropriate values.

If the image capturing lens is configured to satisfy the conditional expression (11a), the lens may be made bright more reliably.

The conditional expression (12a): $50<v4<65$ relates to the Abbe number of optical member used for the fourth lens and defines a desirable range for the improvement that focuses more on lateral chromatic aberration than on longitudinal chromatic aberration. If the image capturing lens is configured to satisfy the conditional expression (12a), lateral chromatic aberration is improved more reliably while degradation of longitudinal chromatic aberration is inhibited.

Here, if the image capturing lens is configured to fall below the lower limit of the conditional expression (12a), a problem arises that correction of longitudinal chromatic aberration becomes difficult. On the other hand, if the image capturing lens is configured to exceed the upper limit of the conditional expression (12a), a problem arises that the correction of longitudinal chromatic aberration becomes difficult.

The conditional expression (13a): $50<v5<65$ defines a desirable range of Abbe number of optical member used for the fifth lens.

The conditional expression (13a) defines the range of Abbe number of optical member used for the fifth lens and defines a desirable range for mainly correcting lateral chromatic aberration, though the amount of correction is small in comparison with that of the lateral chromatic aberration in the fourth lens. If either of the upper and lower limits of the conditional expression (13a) is exceeded, improvement of lateral chromatic aberration becomes difficult.

The conditional expression (14a): $-4<\Sigma(fj/vj)/f<4$ defines a desirable range of the relationship of the focal length of each of the first to fifth lenses and the Abbe number of optical member constituting each lens to the focal length of the entire lens system.

If the upper limit of the conditional expression (14a) is exceeded, correction of longitudinal chromatic aberration becomes insufficient and the longitudinal chromatic aberration becomes too large. On the other hand, if the lower limit of the conditional expression (14a) is exceeded, correction of longitudinal chromatic aberration becomes excessive and the longitudinal chromatic aberration becomes too large again.

If the image capturing lens is configured to satisfy the conditional expression (14b): $-2<\Sigma(fj/vj)/f<0.5$, the problems that occur at the lower and upper limits described above may be improved more reliably.

SPECIFIC EXAMPLES

Specific examples of the image capturing lens according to the present embodiment will be described collectively.

Figure 2:
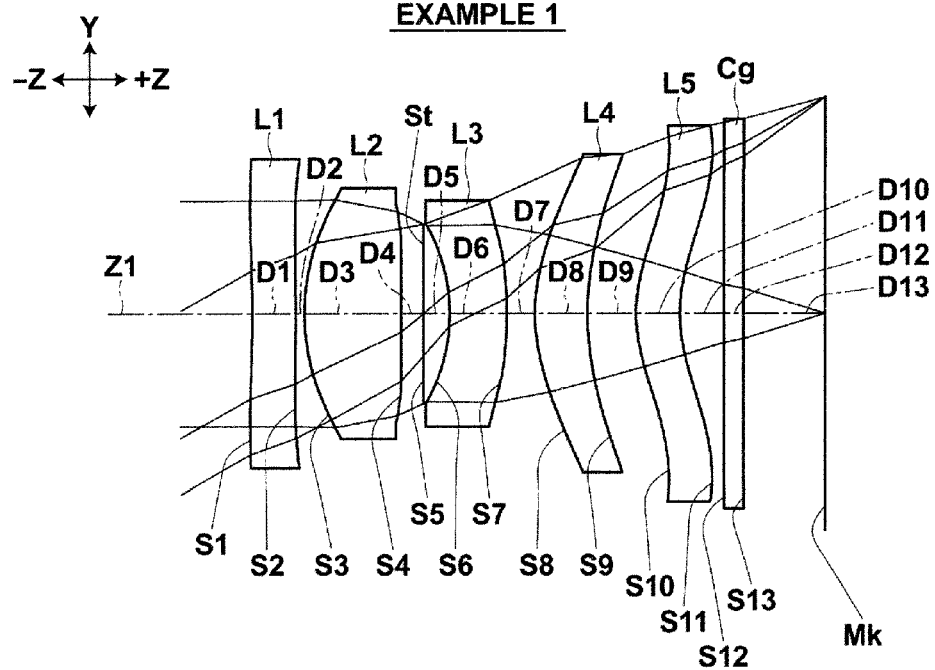
FIG. 2 is a cross-sectional view of an image capturing lens of Example 1, illustrating the cross-section thereof.

FIGS. 2 to 4 illustrate cross-sections of image capturing lenses corresponding to Examples 1 to 3 respectively.

In FIGS. 2 to 4, the symbol Lj represents $j^{th}$ lens in which a number j is given to each lens in a serially increasing manner toward the image side (image forming side) with the most object side lens being taken as the first lens. The symbol Si represents $i^{th}$ surface (which includes aperture stop and the like) in which a number is given to each surface in a serially increasing manner toward the image side (image forming side) with the object side surface of the most object side lens being taken as the first surface. The symbol Di represents the distance between $i^{th}$ surface and $(i+1)^{th}$ surface on the optical axis.

Components of image capturing lenses of Examples 1 to 3 shown in FIGS. 2 to 4 identical to those of the image capturing lens 100 already described are given the same symbols.

Tables 1 to 3 show specific lens data of image capturing lenses of Examples 1 to 3. The upper side (indicated by the symbol (a)) of each of tables 1 to 3 shows specific lens data and the lower side (indicated by the symbol (b)) shows aspherical surface coefficients.

The aspherical surface expression used here is given below.

$$Z = C \cdot h^2 / \{1 + (1 - K \cdot C^2 \cdot h^2)^{1/2}\} + \Sigma Ai \cdot hi$$

where:
Z: depth of an aspherical surface (mm)
H: distance (height) from the optical axis to the lens surface (mm)
K: eccentricity
C: paraxial curvature=1/R (R: paraxial radius of curvature)
Ai: $i^{th}$ order (i is an integer greater than or equal to 3) aspherical surface coefficient The * mark attached to a surface number indicates that the surface is an aspherical surface. The value of the focal length f of the entire lens system, value of the F-number (FNo.) and value of the total angle of view $2\omega$ (°) are shown in the lower margin of the basic lens data indicated by the symbol (a).

The column of surface number Si of basic lens data in each table shows $i^{th}$ surface number in which a number i is given to each surface in a serially increasing manner toward the image side with the surface on the object side of the most object side lens element being taken as the first surface. Note that the aperture stop St and cover glass Cg are included in the lens element. The column of radius of curvature Ri shows the value of the radius of curvature of $i^{th}$ surface (lens element surface) from the object side (mm). The positive or negative for a radius of curvature is decided such that if the surface is convex on the object side, it is positive while if the surface is convex on the image side, it is negative. The column of surface distance Di shows the distance between $i^{th}$ surface Si from the object side and $(i+1)^{th}$ surface Si+1 on the optical axis (mm). The column of Ndj shows the value of refractive index of $j^{th}$ optical element from the object side with respect to the d-line (587.6 nm). The column of vdj shows the value of Abbe number of $j^{th}$ optical element from the object side with reference to the d-line.

The radius of curvature of an aspherical surface shown in the basic lens data is the value of radius of curvature in the paraxial region of the aspherical surface.

Table 4 summarizes the value calculated by the formula in each conditional expression described above, and the value representing a physical property value, lens performance, and the like described in the conditional expression for image capturing lenses of Examples 1 to 3. In Table 4, the numerical values with the mark ♦ attached thereto indicate that they are values outside of the ranges satisfying the respective conditional expressions.

The diagrams indicated by the symbols α, β, and γ in FIGS. 5 to 7 illustrate spherical aberration, field curvature (astigmatism), and distortion aberration (distortion) of image capturing lenses of Examples 1 to 3 respectively. Each aberration diagram shows aberration with the e-line (wavelength 546.07 nm) as the reference wavelength. The spherical aberration diagram and astigmatism diagram also illustrate aberrations with respect to the F-line (wavelength 486.13 nm) and C-line (wavelength 656.27 nm). In the diagram indicating field curvature (astigmatism), the solid line illustrates aberration in the saggital direction (S) while the broken line illustrates aberration in the tangential direction (T). FNo. represents F-number and Y represents image height.

As is known from the data of each numerical value and each aberration diagram, each of the image capturing lenses of Examples 1, 2, and 3 in the embodiment of the present invention is bright and high resolution to a peripheral angle of view with reduced overall optical length.

Figure 8:
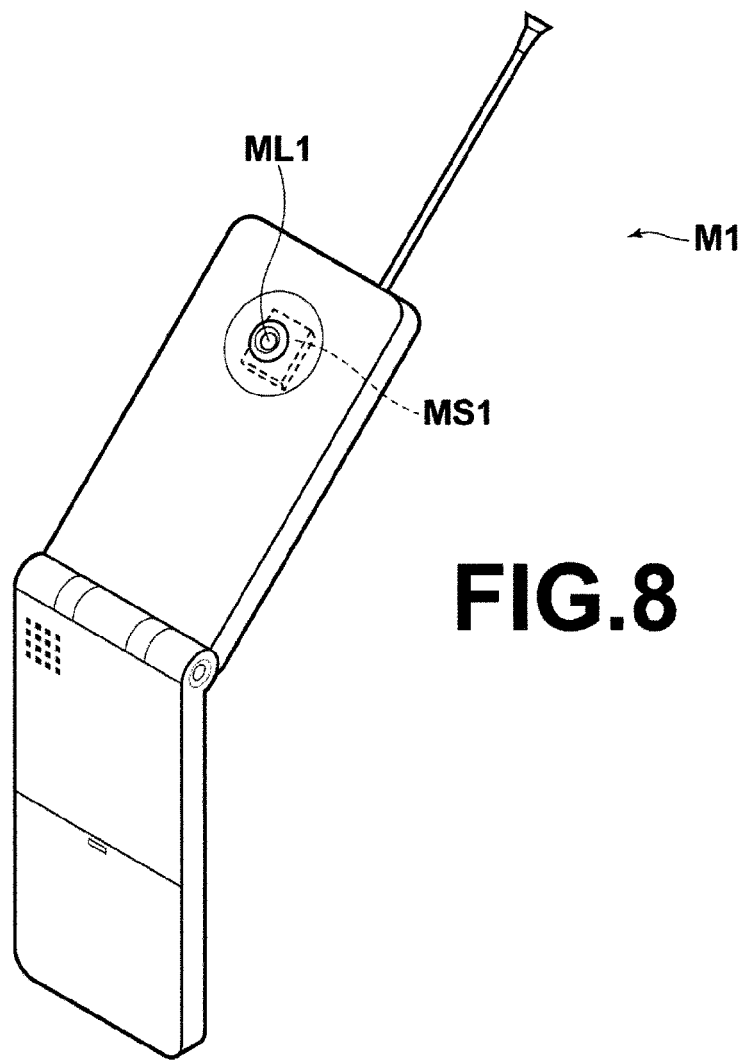
FIG. 8 illustrates a cell phone provided with the image capturing lens of the present invention.

FIG. 8 illustrates an overview of a camera-equipped cell phone M1 which is an example of the image capturing apparatus of the present invention. The camera-equipped cell phone M1 includes an image capturing lens ML1 according to an embodiment of the present invention and an image sensor MS1, such as a CCD or the like, for capturing an optical image formed by the image capturing lens ML1 and outputting an image capturing signal according to the optical image. The image sensor MS1 is disposed on the image forming surface (image capturing surface) of the image capturing lens ML1.

Figure 9:
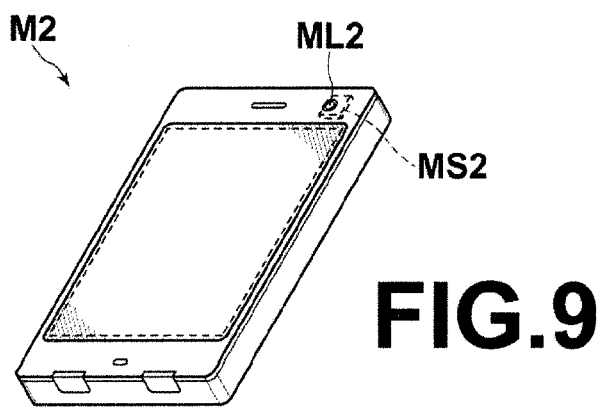
FIG. 9 illustrates a smartphone provided with the image capturing lens of the present invention.

FIG. 9 illustrates an overview of a smartphone M2 which is an example of the image capturing apparatus of the present invention. The smartphone M2 includes an image capturing lens ML2 according to an embodiment of the present invention and an image sensor MS2, such as a CCD or the like, for capturing an optical image formed by the image capturing lens ML2 and outputting an image capturing signal according to the optical image. The image sensor MS2 is disposed on the image forming surface (image capturing surface) of the image capturing lens ML2.

It should be understood that the present invention is not limited to the embodiment described above and each example, and various changes and modifications may be made without departing from the spirit of the invention. For example, values of radius of curvature of each lens, surface distance, refractive index, and the like are not limited to those shown in each table and may take other values.

TABLE 1

(a)
EXAMPLE 1 - BASIC LENS DATA

| Si (S-No.) | Ri (R-CUR.) | Di (S-DIST.) | Ndj (R-INDEX) | vdj (ABBE No.) |
|---|---|---|---|---|
| *1 | −13.9260 | 0.5000 | 1.5339 | 56.0 |
| *2 | −20.3911 | 0.1000 | | |
| *3 | 2.0426 | 1.0950 | 1.5311 | 55.3 |
| *4 | 22.3258 | 0.2520 | | |
| 5 | ∞(A-stop) | 0.3020 | | |
| *6 | −1.7702 | 0.6490 | 1.6317 | 23.3 |
| *7 | −4.7761 | 0.3160 | | |
| *8 | 1.6884 | 0.5970 | 1.5311 | 55.3 |
| *9 | 2.7641 | 0.5490 | | |
| *10 | 1.4397 | 0.5000 | 1.5311 | 55.3 |
| *11 | 1.5254 | 0.5000 | | |
| 12 | ∞ | 0.2200 | 1.5168 | 64.2 |
| 13 | ∞ | 0.9130 | | |

(b)
EXAMPLE 1 - ASPHERICAL SURFACE DATA

| A/S COEFF. S1 | |
|---|---|
| KA | 4.004448E−01 |
| RA4 | 1.802036E−02 |
| RA6 | −2.179541E−03 |
| RA8 | 1.028976E−04 |
| RA10 | −4.735551E−05 |
| A/S COEFF. S2 | |
| KA | −2.850603E+00 |
| RA4 | 1.932204E−02 |
| RA6 | −2.975026E−04 |
| RA8 | −8.039206E−04 |
| RA10 | 1.619006E−04 |
| A/S COEFF. S3 | |
| KA | 7.898001E−01 |
| RA3 | −8.028696E−03 |
| RA4 | 8.157224E−03 |
| RA5 | −7.974742E−03 |
| RA6 | 1.665396E−03 |
| RA7 | 2.264486E−03 |
| RA8 | −9.202174E−03 |
| RA9 | 9.780547E−05 |
| RA10 | 1.074320E−02 |
| RA11 | −5.945536E−04 |
| RA12 | −7.034631E−03 |
| RA13 | 2.199367E−05 |
| RA14 | 2.218232E−03 |
| RA15 | 1.103776E−04 |
| RA16 | −4.454600E−04 |
| A/S COEFF. S4 | |
| KA | −1.869074E+01 |
| RA3 | −1.054013E−02 |
| RA4 | −1.935953E−02 |
| RA5 | −2.494181E−02 |
| RA6 | −5.021814E−03 |
| RA7 | 2.937579E−03 |
| RA8 | 3.126626E−03 |
| RA9 | 1.116364E−03 |
| RA10 | −6.380153E−04 |
| RA11 | 4.477588E−04 |
| RA12 | −2.829541E−04 |
| RA13 | −9.772915E−04 |
| RA14 | −8.358082E−04 |
| RA15 | 8.374519E−04 |
| RA16 | 0.000000E+00 |
| RA17 | 0.000000E+00 |

TABLE 1-continued

| | |
|---|---|
| RA18 | 0.000000E+00 |
| RA19 | 0.000000E+00 |
| RA20 | 0.000000E+00 |
| A/S COEFF. S6 | |
| KA | 6.458909E−01 |
| RA4 | −6.330430E−02 |
| RA6 | 4.514177E−02 |
| RA8 | −1.075283E−02 |
| RA10 | 1.519621E−02 |
| RA12 | 4.122448E−03 |
| RA14 | 1.431113E−03 |
| RA16 | −9.246459E−03 |
| A/S COEFF. S7 | |
| KA | 3.046584E+00 |
| RA4 | −1.328139E−01 |
| RA6 | 1.454744E−01 |
| RA8 | −1.074482E−01 |
| RA10 | 6.938496E−02 |
| RA12 | −2.585333E−02 |
| RA14 | 6.569770E−03 |
| RA16 | −1.332093E−03 |
| A/S COEFF. S8 | |
| KA | 6.536353E−01 |
| RA4 | −1.097254E−01 |
| RA6 | 5.091273E−02 |
| RA8 | −1.918079E−02 |
| RA10 | 2.972246E−03 |
| RA12 | 5.792759E−05 |
| RA14 | −8.670799E−05 |
| RA16 | 3.297403E−06 |
| A/S COEFF. S9 | |
| KA | 1.279691E−01 |
| RA4 | −2.932357E−02 |
| RA6 | 9.205255E−03 |
| RA8 | 4.678039E−04 |
| RA10 | −4.238121E−04 |
| RA12 | −4.277536E−04 |
| RA14 | 1.775174E−04 |
| RA16 | −1.956909E−05 |
| A/S COEFF. S10 | |
| KA | −1.052110E+00 |
| RA4 | −7.512560E−02 |
| RA6 | 7.330544E−03 |
| RA8 | 1.907740E−03 |
| RA10 | −4.234187E−04 |
| A/S COEFF. S11 | |
| KA | −1.044683E+00 |
| RA4 | −6.655051E−02 |
| RA6 | 5.904965E−03 |
| RA8 | 1.149526E−03 |
| RA10 | −2.588535E−04 |

*ASPHERICAL SURFACE
f = 4.325 FNo. = 1.83 2ω = 54.6°

TABLE 2

(a)
EXAMPLE 2- BASIC LENS DATA

| Si (S-No.) | Ri (R-CUR.) | Di (S-DIST.) | Ndj (R-INDEX) | νdj (ABBE No.) |
|---|---|---|---|---|
| *1 | −2.5727 | 0.3800 | 1.5302 | 73.0 |
| *2 | −3.2958 | 0.2000 | | |
| *3 | 1.7050 | 0.7820 | 1.4714 | 76.6 |
| *4 | −13.2621 | 0.2500 | | |
| 5 | ∞(A-stop) | 0.2650 | | |
| *6 | −2.2679 | 0.3400 | 1.6317 | 23.3 |
| *7 | −7.1703 | 0.1160 | | |
| *8 | 1.3717 | 0.3820 | 1.5311 | 55.3 |
| *9 | 2.5419 | 0.4280 | | |
| *10 | 1.1573 | 0.4950 | 1.5311 | 55.3 |
| *11 | 1.0829 | 0.5000 | | |
| 12 | ∞ | 0.1500 | 1.5168 | 64.2 |
| 13 | ∞ | 0.3380 | | |

(b)
EXAMPLE 2- ASPHERICAL SURFACE DATA

| | |
|---|---|
| A/S COEFF. S1 | |
| KA | −1.000009E+00 |
| RA4 | 4.177059E−02 |
| RA6 | −9.488354E−03 |
| RA8 | 8.477861E−04 |
| RA10 | −2.748657E−04 |
| A/S COEFF. S2 | |
| KA | 1.172168E−02 |
| RA4 | 2.759216E−02 |
| RA6 | 6.672322E−03 |
| RA8 | −7.698782E−03 |
| RA10 | 1.080817E−03 |
| A/S COEFF. S3 | |
| KA | 5.886211E−01 |
| RA3 | −4.537925E−03 |
| RA4 | −2.937080E−02 |
| RA5 | −6.051048E−02 |
| RA6 | 2.582238E−02 |
| RA7 | 2.501082E−02 |
| RA8 | −2.644591E−02 |
| RA9 | −1.228386E−02 |
| RA10 | 6.200243E−04 |
| RA11 | −7.309757E−03 |
| RA12 | −7.213348E−03 |
| RA13 | 7.713196E−03 |
| RA14 | 1.074336E−02 |
| RA15 | 3.516242E−03 |
| RA16 | −1.283934E−02 |
| A/S COEFF. S4 | |
| KA | −9.000000E−06 |
| RA3 | 3.631456E−03 |
| RA4 | −1.023340E−01 |
| RA5 | 3.380568E−02 |
| RA6 | 3.227923E−02 |
| RA7 | −3.847425E−02 |
| RA8 | −3.573858E−02 |
| RA9 | −4.126798E−03 |
| RA10 | 3.220717E−02 |
| RA11 | 5.482739E−02 |
| RA12 | 6.110615E−02 |
| RA13 | −2.205555E−01 |
| RA14 | −1.055548E−01 |
| RA15 | 2.063210E−01 |
| RA16 | 0.000000E+00 |
| RA17 | 0.000000E+00 |
| RA18 | 0.000000E+00 |
| RA19 | 0.000000E+00 |
| RA20 | 0.000000E+00 |
| A/S COEFF. S6 | |
| KA | 1.709418E−01 |
| RA4 | −1.001138E−01 |
| RA6 | 6.048835E−02 |
| RA8 | 5.590983E−01 |
| RA10 | −4.995210E+00 |
| RA12 | −6.467453E+00 |
| RA14 | 1.630360E+01 |
| RA16 | −4.570668E+00 |
| A/S COEFF. S7 | |
| KA | 6.000090E−01 |
| RA4 | −3.986451E−01 |
| RA6 | 3.966991E−01 |
| RA8 | −5.107997E−02 |
| RA10 | 9.138137E−02 |
| RA12 | −3.102352E−01 |
| RA14 | −8.231243E−01 |
| RA16 | 1.397278E+00 |

TABLE 2-continued

A/S COEFF. S8

| | |
|---|---|
| KA | 9.110780E−02 |
| RA4 | −2.551993E−01 |
| RA6 | 2.243743E−01 |
| RA8 | −1.691177E−01 |
| RA10 | −6.964365E−03 |
| RA12 | 5.679982E−02 |
| RA14 | 8.144725E−03 |
| RA16 | −2.776850E−02 |

A/S COEFF. S9

| | |
|---|---|
| KA | 1.055321E−01 |
| RA4 | 3.542859E−02 |
| RA6 | −5.915470E−02 |
| RA8 | 6.125592E−03 |
| RA10 | 6.844387E−03 |
| RA12 | −1.294273E−03 |
| RA14 | −2.185979E−03 |
| RA16 | 7.288721E−04 |

A/S COEFF. S10

| | |
|---|---|
| KA | −2.979739E+00 |
| RA4 | −1.198902E−01 |
| RA6 | 5.971662E−03 |
| RA8 | 1.040314E−02 |
| RA10 | −1.776510E−03 |

A/S COEFF. S11

| | |
|---|---|
| KA | −1.861075E+00 |
| RA4 | −1.256366E−01 |
| RA6 | 3.843862E−02 |
| RA8 | −9.661319E−03 |
| RA10 | 1.033402E−03 |

* ASPHERICAL SURFACE
f = 2.762 FNo. = 2.60 2ω = 78.0°

TABLE 3

(a)
EXAMPLE 3- BASIC LENS DATA

| Si (S-No.) | Ri (R-CUR.) | Di (S-DIST.) | Ndj (R-INDEX) | νdj (ABBE No.) |
|---|---|---|---|---|
| *1 | −2.4269 | 0.3800 | 1.5304 | 95.0 |
| *2 | −3.2624 | 0.2000 | | |
| *3 | 1.6250 | 0.9350 | 1.4714 | 76.6 |
| *4 | −23.0624 | 0.2500 | | |
| 5 | ∞(A-stop) | 0.3520 | | |
| *6 | −1.5473 | 0.3930 | 1.6317 | 23.3 |
| *7 | −4.5853 | 0.1310 | | |
| *8 | 1.4438 | 0.4690 | 1.5311 | 55.3 |
| *9 | 4.0213 | 0.4880 | | |
| *10 | 1.1842 | 0.4950 | 1.5311 | 55.3 |
| *11 | 1.0473 | 0.5000 | | |
| 12 | ∞ | 0.1500 | 1.5168 | 64.2 |
| 13 | ∞ | 0.4310 | | |

(b)
EXAMPLE 3- ASPHERICAL SURFACE DATA

A/S COEFF. S1

| | |
|---|---|
| KA | −1.000009E+00 |
| RA4 | 4.859194E−02 |
| RA6 | −9.132836E−03 |
| RA8 | 4.261141E−04 |
| RA10 | −1.176324E−04 |

A/S COEFF. S2

| | |
|---|---|
| KA | 5.050000E−06 |
| RA4 | 4.099160E−02 |
| RA6 | 7.785770E−03 |
| RA8 | −7.671749E−03 |
| RA10 | 9.044472E−04 |

TABLE 3-continued

A/S COEFF. S3

| | |
|---|---|
| KA | 8.903820E−01 |
| RA3 | −1.040387E−02 |
| RA4 | 1.565921E−02 |
| RA5 | −7.263646E−02 |
| RA6 | 4.001743E−02 |
| RA7 | 3.313210E−02 |
| RA8 | −1.129072E−02 |
| RA9 | −1.185513E−02 |
| RA10 | −2.649476E−03 |
| RA11 | −1.164522E−02 |
| RA12 | −1.050538E−02 |
| RA13 | 6.437395E−03 |
| RA14 | 1.132430E−02 |
| RA15 | 5.042392E−03 |
| RA16 | −1.164085E−02 |

A/S COEFF. S4

| | |
|---|---|
| KA | −9.000000E−06 |
| RA3 | 1.938750E−03 |
| RA4 | −7.728788E−02 |
| RA5 | 8.722581E−02 |
| RA6 | 3.647823E−02 |
| RA7 | −1.269128E−01 |
| RA8 | −8.969037E−02 |
| RA9 | −9.844025E−03 |
| RA10 | 1.044432E−01 |
| RA11 | 2.133982E−01 |
| RA12 | 3.198343E−01 |
| RA13 | −7.481527E−01 |
| RA14 | −3.607263E−01 |
| RA15 | 6.072180E−01 |
| RA16 | 0.000000E+00 |
| RA17 | 0.000000E+00 |
| RA18 | 0.000000E+00 |
| RA19 | 0.000000E+00 |
| RA20 | 0.000000E+00 |

A/S COEFF. S6

| | |
|---|---|
| KA | 2.019208E−01 |
| RA4 | −1.483083E−01 |
| RA6 | −5.052370E−02 |
| RA8 | 3.828937E−01 |
| RA10 | −3.357953E−01 |
| RA12 | −8.732950E+00 |
| RA14 | 2.846775E+01 |
| RA16 | −2.565173E+01 |

A/S COEFF. S7

| | |
|---|---|
| KA | 3.961260E−01 |
| RA4 | −4.373704E−01 |
| RA6 | 3.643191E−01 |
| RA8 | −2.390382E−01 |
| RA10 | 4.157279E−02 |
| RA12 | 6.038151E−02 |
| RA14 | −3.094079E−01 |
| RA16 | 2.538462E−01 |

A/S COEFF. S8

| | |
|---|---|
| KA | 3.888406E−01 |
| RA4 | −2.772613E−01 |
| RA6 | 2.350772E−01 |
| RA8 | −1.769319E−01 |
| RA10 | 1.165550E−02 |
| RA12 | 5.155364E−02 |
| RA14 | −1.425130E−02 |
| RA16 | −8.862931E−03 |

A/S COEFF. S9

| | |
|---|---|
| KA | 3.963338E−02 |
| RA4 | 4.017503E−02 |
| RA6 | −4.492649E−02 |
| RA8 | 2.995498E−03 |
| RA10 | 6.229160E−03 |
| RA12 | −1.763531E−03 |
| RA14 | −1.178358E−03 |
| RA16 | 4.410330E−04 |

TABLE 3-continued

| A/S COEFF. S10 | |
|---|---|
| KA | -2.646033E+00 |
| RA4 | -1.407233E-01 |
| RA6 | 9.965750E-03 |
| RA8 | 1.039514E-02 |
| RA10 | -1.749834E-03 |

| A/S COEFF. S11 | |
|---|---|
| KA | -1.793116E+00 |
| RA4 | -1.389301E-01 |
| RA6 | 4.147431E-02 |
| RA8 | -9.514833E-03 |
| RA10 | 1.008236E-03 |

*ASPHERICAL SURFACE
f = 3.138 FNo. = 2.60 2ω = 70.9°

TABLE 4

| | | VALUE OF FORMULA IN C/E | | |
|---|---|---|---|---|
| C/E SYMBOL | C/E (INEQUALITY) | EXAMPLE 1 | EXAMPLE 2 | EXAMPLE 3 |
| (1a) | 1.0 ≤ TL/f ≤ 1.8 | 1.48 | 1.66 | 1.63 |
| (2a) | 0.09 < Dg2 – 3/f | 0.128 | 0.187 | 0.192 |
| (3a) | 0.07 < | N2 – N3 | | 0.101 | 0.165 | 0.165 |
| (4a) | −35 ≤ f1/f ≤ −2.3 | −19.5 | −9.81 | −6.76 |
| (4b) | −30 ≤ f1/f ≤ −4.0 | −19.5 | −9.81 | −6.76 |
| (5a) | 0.80 ≤ f12/f ≤ 1.40 | 0.997 | 1.25 | 1.14 |
| (5b) | 0.80 ≤ f12/f ≤ 1.30 | 0.997 | 1.25 | 1.14 |
| (5c) | 0.60 ≤ f12/f ≤ 1.30 | 0.997 | 1.25 | 1.14 |
| (5d) | 0.65 ≤ f12/f ≤ 1.30 | 0.997 | 1.25 | 1.14 |
| (6a) | 54 < ν2 | 55.3 | 76.6 | 76.6 |
| (6b) | 55 < ν2 < 65 | 55.3 | ◆76.6 | ◆76.6 |
| (7a) | 20 < ν3 < 35 | 23.3 | 23.3 | 23.3 |
| (8a) | −12 < (R1 + R2)/(R1 − R2) < −0.21 | −5.31 | −8.12 | −6.81 |
| (9a) | 50 < ν1 < 65 | 56.0 | ◆73.0 | ◆95.0 |
| (9b) | 20 ≤ ν1 < 75 | 56.0 | 73.0 | ◆95.0 |
| (9c) | 20 ≤ ν1 ≤ 95 | 56.0 | 73.0 | 95.0 |
| (10a) | 0.7 ≤ f4/f ≤ 2.1 | 1.58 | 1.82 | 1.27 |
| (11a) | 0.25 < (Dg2 + Dg3)/f < 0.7 | 0.403 | 0.407 | 0.424 |
| (12a) | 50 < ν4 < 65 | 55.3 | 55.3 | 55.3 |
| (13a) | 50 < ν5 < 65 | 55.3 | 55.3 | 55.3 |
| (14a) | −4.0 < Σ (fj/νj)/f < 4.0 | −0.285 | −0.0116 | 0.292 |
| (14b) | −2.0 < Σ (fj/νj)/f < 0.5 | −0.285 | −0.0116 | 0.292 |

◆: VALUE OUTSIDE OF C/E RANGE

What is claimed is:

1. An image capturing lens substantially consisting of a first lens having a negative power, a second lens having a positive power, a third lens having a negative power, a fourth lens having a positive power, and a fifth lens having a positive power, arranged in this order from the object side, wherein:

the image side surface of the fifth lens has an aspherical shape with one or more inflection points and a concave shape toward the image side in a paraxial region; and the image capturing lens satisfies the following conditional expressions (1a), (2a), (3a), and (4a) simultaneously:

$$1.0 \leq TL/f \leq 1.8 \tag{1a}$$

$$0.09 < Dg_{2-3}/f \tag{2a}$$

$$0.07 < |N2-N3| \tag{3a; and}$$

$$-35 \leq f1/f \leq -2.3 \tag{4a},$$

where:
TL is an overall optical length when a distance from the image side surface of the fifth lens to the image plane is represented by an air equivalent length;
f is a focal length of the entire lens system;
f1 is a focal length of the first lens;
$Dg_{2-3}$ is a distance (air space) between the image side surface of the second lens and the object side surface of the third lens;
N2 is a refractive index of the optical member constituting the second lens; and
N3 is a refractive index of the optical member constituting the third lens.

2. The image capturing lens of claim 1, wherein the lens satisfies the following conditional expression (5a):

$$0.80 \leq f12/f \leq 1.40 \tag{5a},$$

where f12 is a combined focal length of the first and second lenses.

3. The image capturing lens of claim 1, wherein the lens satisfies the following conditional expression (6a):

$$54 < \nu2 \tag{6a},$$

where ν2 is an Abbe number of the second lens.

4. The image capturing lens of claim 1, wherein the lens satisfies the following conditional expression (7a):

$$20 < \nu3 < 35 \tag{7a},$$

where ν3 is an Abbe number of the third lens.

5. The image capturing lens of claim 1, wherein the lens satisfies the following conditional expression (8a):

$$-12 < (R1+R2)/(R1-R2) < -0.21 \tag{8a},$$

where:
R1 is a radius of curvature of the object side surface of the first lens (first lens surface); and
R2 is a radius of curvature of the image side surface of the first lens (second lens surface).

6. The image capturing lens of claim 1, wherein the lens satisfies the following conditional expression (9a):

$$20 < v1 < 95 \quad (9a),$$

where v1 is an Abbe number of the first lens.

7. The image capturing lens of claim 1, wherein the lens satisfies the following conditional expression (10a):

$$0.7 \leq f4/f \leq 2.1 \quad (10a),$$

where f4 is a focal length of the fourth lens.

8. The image capturing lens of claim 1, wherein the lens satisfies the following conditional expression (11a):

$$0.25 < (Dg2 + Dg3)/f < 0.7 \quad (11a),$$

where:
  Dg2 is a center thickness of the second lens (distance between the object side surface and image side surface of the second lens on the optical axis; actual length); and
  Dg3 is a center thickness of the second lens (distance between the object side surface and image side surface of the third lens on the optical axis; actual length).

9. The image capturing lens of claim 1, wherein the lens satisfies the following conditional expression (12a):

$$50 < v4 < 65 \quad (12a),$$

where v4 is an Abbe number of the fourth lens.

10. The image capturing lens of claim 1, wherein the lens satisfies the following conditional expression (13a):

$$50 < v5 < 65 \quad (13a),$$

where v5 is an Abbe number of the fifth lens.

11. The image capturing lens of claim 1, wherein the lens satisfies the following conditional expression (14a):

$$-4 < \Sigma(fj/vj)/f < 4 \quad (14a),$$

where $\Sigma(fj/vj)/f$ is $[(f1/v1)+(f2/v2)+(f3/v3)+(f4/v4)+(f5/v5)]/f$ fj is a focal length of the $j^{th}$ lens (where, j=1 to 5); and vj is an Abbe number for the $j^{th}$ lens (where, j=1 to 5).

12. The image capturing lens of claim 1, wherein the image side surface of the fifth lens has only one extreme point.

13. The image capturing lens of claim 1, wherein the lens satisfies the following conditional expression (4b):

$$-30 \leq f1/f \leq -4.0 \quad (4b).$$

14. The image capturing lens of claim 1, wherein the lens satisfies the following conditional expression (5b):

$$0.80 \leq f12/f \leq 1.30 \quad (5b),$$

where f12 is a combined focal length of the first and second lenses.

15. The image capturing lens of claim 1, wherein the lens satisfies the following conditional expression (5c):

$$0.60 \leq f12/f \leq 1.30 \quad (5c),$$

where f12 is a combined focal length of the first and second lenses.

16. The image capturing lens of claim 1, wherein the lens satisfies the following conditional expression (6b):

$$54 < v2 < 79 \quad (6b),$$

where v2 is an Abbe number of the second lens.

17. The image capturing lens of claim 1, wherein the lens satisfies the following conditional expression (9b):

$$20 < v1 < 75 \quad (9b),$$

where v1 is an Abbe number of the first lens.

18. The image capturing lens of claim 1, wherein the lens satisfies the following conditional expression (9c):

$$50 < v1 < 65 \quad (9c),$$

where v1 is an Abbe number of the first lens.

19. The image capturing lens of claim 1, wherein the lens satisfies the following conditional expression (14b):

$$-2 < \Sigma(fj/vj)/f < 0.5 \quad (14b),$$

where $\Sigma(fj/vj)/f$ is $[(f1/v1)+(f2/v2)+(f3/v3)+f4/v4)+(f5/v5)]/f$ fj is a focal length of the $j^{th}$ lens (where, j=1 to 5); and vj is an Abbe number for the $j^{th}$ lens (where, j=1 to 5).

20. An image capturing apparatus, comprising the image capturing lens of claim 1 and an image sensor for outputting an image capturing signal obtained by capturing an optical image formed by the image capturing lens.

* * * * *